United States Patent [19]
DeForest et al.

[11] 3,796,918
[45] Mar. 12, 1974

[54] CURRENT OVERLOAD PROTECTION SYSTEM

[75] Inventors: Wesley V. DeForest; Bradford N. Hull, both of Long Beach; Harold A. McIntosh, South Pasadena, all of Calif.

[73] Assignee: Robertshaw Controls Company, Richmond, Va.

[22] Filed: Mar. 26, 1973

[21] Appl. No.: 345,011

[52] U.S. Cl............. 317/13 A, 317/16, 317/33 SC, 317/49, 317/22, 317/40, 317/36 TD
[51] Int. Cl...................... H02h 7/085, H02h 3/08
[58] Field of Search.......... 317/16, 33 SC, 49, 13 A, 317/36 TD, 40, 22

[56] References Cited
UNITED STATES PATENTS
3,496,417  2/1970  Tenenbaum ................... 317/33 SC
3,739,229  6/1973  Moran .................................. 317/49

Primary Examiner—J. D. Miller
Assistant Examiner—Harvey Fendelman
Attorney, Agent, or Firm—Fulwider, Patton, Rieber, Lee & Utecht

[57] ABSTRACT

A current overload protection device including a relay for interrupting the primary conductor to an A.C. load and being maintained in a conductive state by the conduction of a first silicon controlled rectifier (SCR) controlling a control switch. The gating signal to the first SCR is connected in shunt by a combination of a second and third SCR which, when both are conducting, will shunt off the gating signal of the first SCR. The second SCR is rendered conductive by a current overload in the primary conductor while the third SCR is gated by a timing network initiated by the closure of the control switch. The timing network includes capacitive elements which must be bled off by interruption of signal before a new timing interval can be achieved.

8 Claims, 2 Drawing Figures

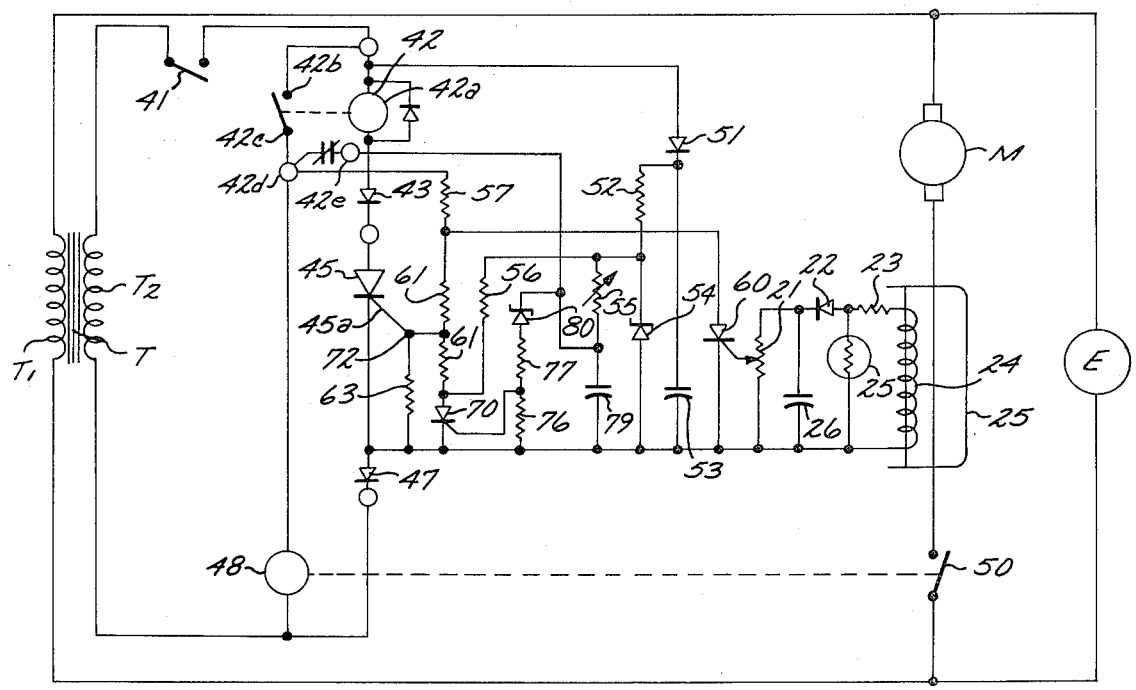
FIG.1
FIG.2
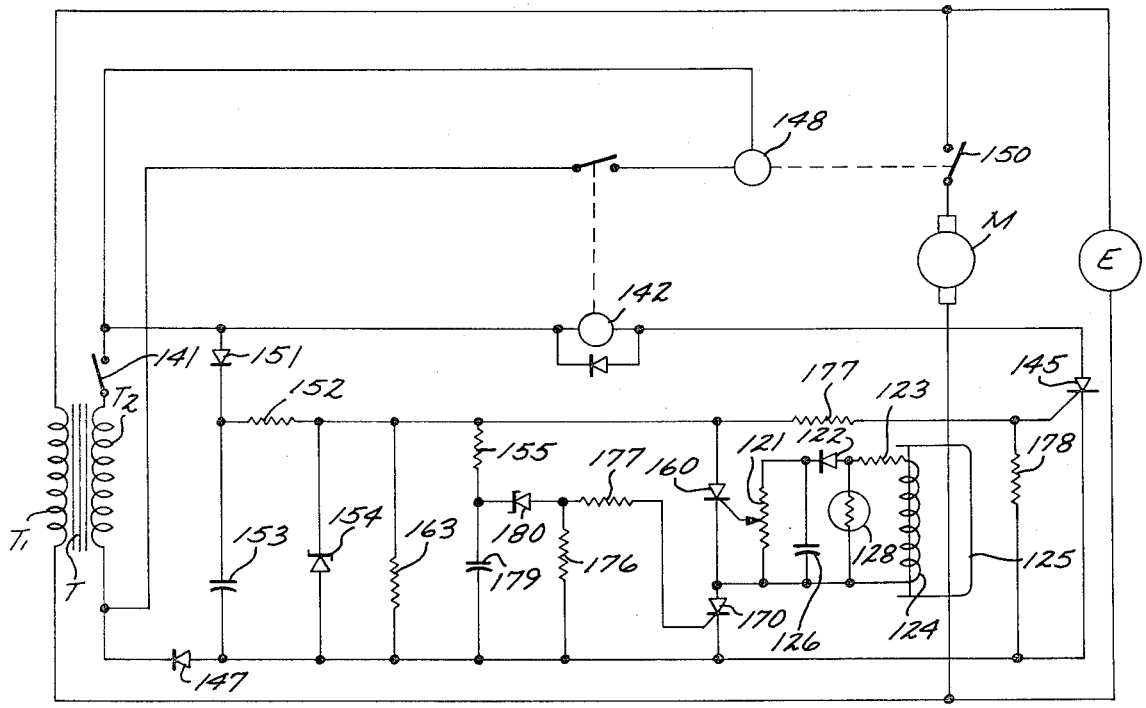

CURRENT OVERLOAD PROTECTION SYSTEM

BACKGROUND OF THE INVENTION

1. Field of the Invention

The present invention relates to current sensing devices and more particularly to current responsive circuit breakers having predetermined time delays.

2. Description of the Prior Art

In electro-mechanical applications, and particularly in applications where electrical motors are used to operate mechanical devices, the possibility of motor overload, and consequent failure of the motor, has frequent occurrence. In such applications the start-up power to the motor, i.e. the power required to bring the apparatus connected to the motor up to speed, is usually high and consequently the current drawn during this time by the motor is high and any current overload devices designed to interrupt the power to the motor upon sensing an overload condition must be able to accommodate this start-up transient. Characteristically the duration of the start-up transient is a matter of design of the motor, being absorbed by the thermal inertia thereof, and generally the motor will be able to survive the initial heat transient developed thereby. Following start-up, however, the motor is operating at its design load, and consequently at its design thermodynamic exchange level, and any subsequent current overload occurrences may quickly avalanche, since the motor is operating at a high temperature, resulting in a destroyed motor. Thus it is all important that any current protection device disposed in series with a motor, and particularly an inductive motor, discriminate between the start-up transient of the motor and overloads which are not associated with start-up. Heretofore all prior art devices of this type typically did not distinguish between the start-up transient and a subsequent overload condition, such devices being of the type generally designated as a slow blow fuse or of the type where the timing network is combined to be initiated by the overload sensing circuit. Protective circuits of this type do not distinguish between the start-up overload and the running overload at which the tolerance of the motor to overloads is much smaller than during start-up.

SUMMARY OF THE INVENTION

Accordingly, it is the general purpose and object of the present invention to provide an overload protection device in an A.C. circuit which, during start-up, will not interrupt the circuit upon the current overload until a particular time increment has expired, and which subsequent to the start-up time increment will interrupt the protected circuit upon sensing an overload of any duration. Other objects of the invention are to provide an overload protection circuit which in its passive mode monitors the protected circuit without a substantial loading effect and which can be conveniently adjusted to adapt to any level of current overload and start-up time duration.

Briefly, these and other objects are accomplished within the present invention by providing a relay switch in the primary load circuit, having a winding connected in series with a start-up switch and a first silicon controlled rectifier disposed across a secondary control circuit. Thus the winding of the relay will be energized only if the start-up switch is closed and the silicon controlled rectifier is conducting. The current passed through the primary load circuit is sensed by a sensor loop which, by induction, provides an output signal proportional to the current passing through a primary conductor. The gating current to the first silicon controlled rectifier is also connected to the output side of the starting switch such that the first silicon controlled rectifier, or SCR, will normally conduct after closure of the switch. A combination of a second and third silicon controlled rectifiers are connected in shunt from the gating terminal of the first SCR, where the second rectifier is rendered conductive by the sensor loop, i.e., when the sensor loop produces a sensing current above a predetermined gating current. The third SCR is connected to a timing circuit which renders it conductive a predetermined time interval after the closure of the starting switch. Conduction of both the second and third SCR bleeds off the gating signal from the first SCR to render it nonconductive. In one of the embodiments the second and third rectifiers are connected in series across the gating terminal of the first rectifier, thus producing a logical AND switch arrangement while in another embodiment the second and third rectifiers are connected in parallel from the gating terminal of the first rectifier, such that only conduction through both the second and the third rectifiers will drop the gating voltage of the first rectifier below the gating level. In either embodiment both the second and the third rectifiers have to be rendered conductive in order to render the first rectifier non-conductive. Furthermore the timing circuit is initiated by the start-up switch such that once the start-up transient has occurred the third rectifier remains in the conductive state and any overload occurring subsequent to the start-up transient which will gate the second rectifier immediately rendering the first rectifier non-conductive.

BRIEF DESCRIPTION OF THE DRAWINGS

FIG. 1 is a circuit schematic of one embodiment constructed according to the present invention; and FIG. 2 is a circuit schematic of yet another embodiment constructed according to the present invention.

DESCRIPTION OF THE SPECIFIC EMBODIMENTS

Referring to FIG. 1, one preferred embodiment of an overload protection device 10 embodying the present invention comprises an overload sensing circuit, a timing circuit and a relay switching circuit, all connected to activate a circuit breaker relay switch 50 to provide an overload protection system for protecting the current draw across motor M.

Specifically, the relay switching circuit includes a transformer T having a primary coil $T_1$ connected across a conventional 117 volt A.C. power outlet E, and a secondary coil Thd 2 for reducing the potential to a safe voltage level such as 24 volts to conform to what is considered safe practices for a control circuit. Connected in series with one side of the secondary winding $T_2$ of transformer T is a control switch 41, which on the output thereof, is connected in parallel both to one end of the winding 42(a) of a D.C. relay 42 and a terminal 42(b) thereof. Relay 42 comprises a conventional switching relay having one set of normally open terminals 42(b) and 42(c) and a set of normally closed terminals 42(d) and 42(e) which are reversed in state upon energization of the winding 42(a). On the other side the winding 42(a) of relay 42 connects to a rectifying diode 43 and across said diode to a first silicon controlled rectifier SCR 45, the alignment of diode 43 being of the same polarity as the conductive path of SCR 45. At the output SCR 45 connects to the input of another rectifying diode 47 to return to the other side of the secondary winding $T_2$.

Connected in parallel with winding 42(a), diode 43, SCR 45 and diode 47 is a control circuit including the contacts or terminals 42(b) and 42(c) of the relay 42 which are connected in series with the winding 48 of the circuit breaker relay 50 whereby such relay in its closed position completes a primary circuit including motor M connected across source E. Thus, when SCR 45 is rendered conductive completing the circuit between winding 42(a) and the transformer secondary $T_2$ the contacts 42(b) and 42(c) of relay 42 are closed activating the winding 48 which in turn closes relay 50. In this manner a 24 volt control system provides the requisite control signals to a load operating at 117 volts. Switch 50 will be closed as long as SCR 45 is conducting, since any interruption of the circuit through SCR 45 inactivates the winding 42(a) of the relay 42 thereby opening the switch across terminals 42(b) and 42(c) which in turn inactivates winding 48 and opens switch 50.

SCR 45 is gated to conduct according to the conventional manner of silicon controlled rectifiers by a gate terminal 45(a). The gating signal to the gate terminal 45(a) is alternatively provided by a first gating circuit comprising a diode 51 connected at the anode to the output of switch 41, and connecting at the cathode thereof to a parallel connected resistor 52 and capacitor 53. The other end of resistor 52 is connected both to the cathode of a Zener diode 54, one end of a variable resistor 55 and one end of a fixed resistor 56. A second gating signal connected from the terminal 42(c) of relay 42 also provides a signal to one end of a resistor 57 which is connecting on its other end to the anode of a second SCR 60 and to one end of a resistor 61. The other end of such resistor 61 connects to the gate 45(a) and to a resistor 62 which connects with the end of resistor 56 and the anode of a third SCR 70. A resistor 63 connects across the gate 45(a) and the cathode of SCR 70. Resistors 57, 61 and 63 provide a voltage divider which at the juncture 72 of resistors 61 and 63 is connected to the gate 45(a) of SCR 45.

Resistors 61 and 62, furthermore, are shunted by the SCR 60 such that when SCR 60 is conducting, the gating voltage to the SCR 45 from the resistor 57 is essentially bypassed, and only the signal passed across diode 51 remains to maintain a gating signal at the connection 72 of resistors 61 and 62. This signal is directed across the resistors 52 and 56 in the direction opposite the voltage provided when the SCR 70 is conductive to apply the second gating voltage to the SCR 45, such voltage being effective only if the SCR 70 is non-conductive. The SCR 70 at the cathode thereof is connected to the input of diode 47, such SCR being controlled in response to the voltage on its gating terminal provided by a voltage divider comprising resistors 76 and 77 of a timing circuit where the bottom end of resistor 76 connects to the anode of diode 47 and the upper end of resistor 77 connects to the anode of a Zener diode 80. The cathode of Zener diode 80 is connected both across the normally closed contacts of relay 42 and to the juncture between the capacitor 79 and the variable resistor 55. In this arrangement the Zener diode 80 will provide essentially an infinite resistance in series with resistors 76 and 77 as long as capacitor 79 remains below the Zener breakdown level thereof. Capacitor 79 in turn will be charged up at a charging rate determined by the variable resistor 55. Thus by proper selection of Zener diodes 54 and 80, proper setting of resistor 55 and selection of capacitor 79 a time increment can be developed in which capacitor 79 will charge up to a voltage above Zener diode 80. Once charged up to a voltage above Zener diode 80 the respective resistors 76 and 77 will have a positive voltage at the common juncture thereof to gate the SCR 70. The capacitor 53, across resistors 52 and Zener diode 54, provide a ripple shunt to reduce the transient oscillations out of diode 51, thus assuring a continuous D.C. gating signal to the SCR 70 when capacitor 79 is charged up.

The common junction beetween resistors 57 and 61 is also connected to the anode of the SCR 60, the gate of such SCR being controlled by the current in the wiper of a potentiometer 21 connected in series with a diode 22 and resistor 23 connected across a winding 24 of a conventional inductive pick-up 25 disposed in inductive proximity with the primary lead to motor M. Resistor 21 is further shunted by a capacitor 26 to reduce the ripple and by a negative temperature coefficient resistor 28 which, in combination with resistor 23, stabilizes thermally the preselected value of the variable resistor 21.

In operation the closure of switch 41 applies a voltage across the winding 42(a) while at the same time conducting through diode 51, resistors 52, 56 and 62 the gating voltage to the gate 45(a) of the SCR 45. Once the SCR 45 is gated to conduct, the winding 42(a) is activated pulling in the associated switch to close the terminals 42(b) and 42(c) and activate the winding 48, thereby closing the switch 50 to the motor M. It is to be noted that the gating voltage through diode 51, resistors 52, 56 and 62 to terminal 45(a) is independent of the switch position of relay 42 and is only dependent on the closure of switch 41. Once there is sufficient voltage across winding 42 to pull in the normally open switch formed by terminals 42(b) and 42(c), a second gating voltage across resistor 57 and resistor 61 to terminal 45(a) is developed. It will be appreciated that the resistor 61 is shunted by the SCR 60 when such SCR 60 is conducting. The conduction of SCR 60 is determined by the setting of potentiometer 21 and the induced signal at sensor winding 24. An alternative gating signal to the SCR 45 when the SCR 60 is conducting a gating signal is provided from switch 41 across the diode 51, and resistors 52, 56 and 62 thereby maintaining the relay 42 closed to continue energization of the coil 48 and closure of the switch 50. This gating voltage will only appear at the gate 45(a) of the SCR 45 if SCR 70 is not conducting. SCR 70 will remain non-conductive until the capacitor 79 is charged up to a voltage higher than Zener diode 80, thus providing for a time interval within which alternative gating paths are provided at one end of the voltage divider formed by resistors 61 and 62. In case of conduction of both SCR 70 and SCR 60 both ends of this voltage divider are shunted and there is no voltage to the gate of the SCR 45.

The charging rate of the capacitor is determined primarily by the size of the capacitor and the resistance of the variable potentiometer 55 such that any desired time interval can be selected simply by the setting of resistor 55. The discharge of capacitor 79 during normal operations is provided through the contacts 42(d) and 42(e) which are maintained in their closed position when the winding 42 is deenergized. Accordingly any interruption of the circuit through switch 41 will automatically discharge capacitor 79 thus resetting the time sequence.

In summary the circuit to the motor will be closed as long as either SCR 60 or SCR 70 is not conducting. SCR 70 is rendered conductive a predetermined time interval after the closure of switch 41 and by virtue of Zener diodes 80 and 54 is essentially decoupled from the operation of the rest of the circuit. Similarly SCR 60 will be rendered conductive only if the voltage at the wiper of the potentiometer 21 as dictated by the current to the motor M exceeds the gating voltage thereof.

Referring to FIG. 2 yet another embodiment of the present invention similarly includes the transformer T having the respective primary and secondary windings $T_1$ and $T_2$. The secondary winding $T_2$ is connected in series with a switch 141 which at the output provides an energizing path for the winding of a relay 142. Relay 142, upon closure energizes winding 148 of relay 150, where the circuit including relay 142 is, similar to the first embodiment, completed across a first SCR 145. The first SCR 145 is connected to be gated by switch 141 through a diode 151 connecting with series connected resistors 152 and 177. Connected in shunt across the gate terminal of the SCR 145 is a resistor 178 while the common connecting of resistors 152 and 177 is shunted by a series circuit connecting a second SCR 160 to a third SCR 170. The second SCR 160 is connected at its gate, similar to the first embodiment, to the wiper of a potentiometer 121 which is connected across an inductor winding 124 of an inductive sensor 125 disposed in inductive proximity with a primary lead to the motor M. A diode 122 in series with a resistor 123 rectifies the induced signal of inductor 124 and a capacitor 126 reduces the ripple of rectification. Also connected across potentiometer 121 is a negative temperature coefficient resistor 128 for thermally stabilizing the preset resistance at the wiper thereof. Thus a voltage will be developed at the wiper of potentiometer 121 which, according to the current induced at inductor 124, will reach the gating level of the SCR 160 when the current in the primary conductor is above a predetermined level. The third SCR 170 is gated to conduct, also similar to the first embodiment, by a Zener diode 180 connected in series with a variable resistor 155 at the cathode and a resistor 176 at the anode across Zener diode 154. A timing capacitor 179 connects from the anode of the diode 154 such that a time delay fixed by the setting of resistor 155 and the capacitor 179 is required before the Zener level of diode 180 is reached. When this Zener level is reached a voltage is developed across resistor 176 which is connected across resistor 177 to gate the third SCR 170.

In operation the embodiment illustrated in FIG. 2 requires the concurrent gating of the second and third SCR's in order to render the first SCR 145 non-conductive which, similar to the first embodiment operatively interrupts the primary to the motor. In this embodiment, however, there is no direct bleed-off of capacitor 179 such being provided by the resistor 163 once switch 141 is opened. Accordingly a particular reset interval must be allowed by opening switch 141 in which capacitor 179 is bled off in order to achieve a full start-up timing interval.

From the foregoing it will be readily apparent that the current overload protection system of the present invention provides an economical and convenient means for sensing the normal running current drawn by an electrical motor and which is responsive, after a selected time delay, to sense a predetermined overload current to de-energize the motor.

Various modifications and changes may be made with regard to the foregoing detailed description without departing from the spirit of the invention.

What is claimed is:

1. Apparatus for interrupting the continuity of an A.C. powered electrical primary circuit upon sensing a current overload therein of a duration greater than a predetermined time interval following the application of power to a load, comprising:

a switch adapted to receive an electrical signal at one end thereof;

first relay means disposed to provide circuit continuity in said primary circuit upon receiving a secondary signal at the winding thereof;

current sensing means disposed in inductive proximity with a conductor connected in series with the primary circuit;

first SCR means operatively connected to said current sensing means to be rendered conductivee at a predetermined level of sensed current in said sensing means;

second SCR means operatively connected to the other end of said switch to be rendered conductive independent of the level of said sensed current a preselected interval of time subsequent to the closing thereof; and third SCR means connected in series with said winding of said relay means and the other end of said switch including gate means operatively connected between the other end of said switch and said first and second SCR means for enabling said third SCR means to conduct concurrent with the conduction of either the first or the second SCR means and for rendering said third SCR non-conductive when both the first and second SCR means are concurrently conductive.

2. Apparatus responsive to a current overload in an A.C. circuit, comprising:

current sensing means disposed in inductive proximity with the A.C. circuit for producing a first electrical gating signal indicative of the current level therein;

circuit breaking means disposed in the A.C. circuit including a winding for rendering the circuit conductive upon receiving a secondary signal at said winding;

switch means disposed in series with said winding for providing said secondary signal to one end of said winding at the closing thereof;

first SCR means connected in series with the other end of said winding including a first gate terminal connected to said switch means for rendering said first SCR means conductive upon the closing of said switch means and receipt of said secondary signal;

timing means connected to said switch means for producing a second electrical gating signal independent of the current sensed by said current sensing means a preselected interval of time subsequent to the closing of said switch means;

second SCR means connected to said first gate terminal including a second gate terminal disposed to receive said first gating signal for rendering said second SCR means conductive upon receipt of said first gating signal; and third SCR means connected to said first gate means including a third gate terminal disposed to receive said second gating signal for rendering said third SCR means conductive and for shorting out said secondary signal to said first gate terminal when said second SCR means is conducting.

3. Apparatus according to claim 2, further comprising:

first rectifying means disposed between said switch means and said first, second and third SCR means and said timing means for providing rectified A.C. signals thereto; and second rectifying means disposed in said current sensing means for rendering said first gating signal a rectified A.C. signal whereby said current sensing means is rendered independent of the phase and frequency of said A.C. circuit.

4. Apparatus according to claim 3, further comprising:

signal smoothing means connected across said timing, current sensing and second and third SCR means for smoothing the rectified A.C. signals thereof.

5. Apparatus according to claim 4 wherein:

said first, second and third SCR means include silicon controlled rectifiers.

6. Apparatus according to claim 5 wherein:

said current sensing means includes temperature compensation means for maintaining said first gating signal independent of the temperature thereof.

7. Apparatus according to claim 6 wherein:

said second and third SCR means are connected in parallel to said first gate terminal.

8. Apparatus according to claim 6 wherein:

said second and third SCR means are connected in series.

* * * * *